United States Patent [19]
Kaiser et al.

[11] Patent Number: 5,247,537
[45] Date of Patent: Sep. 21, 1993

[54] ROTATABLE VACUUM SEALED MOUNT FOR OPTICAL ELEMENT, ENDBELL ASSEMBLY FOR GAS DISCHARGE TUBE USING SAID MOUNT AND GAS DISCHARGE TUBE FOR ION LASER USING SAID MOUNT

[75] Inventors: Jeffrey L. Kaiser, Mountain View; Denes A. Hegedus, Redwwod City, both of Calif.

[73] Assignee: Spectra-Physics Lasers, Inc., Mountain View, Calif.

[21] Appl. No.: 794,472

[22] Filed: Nov. 19, 1991

[51] Int. Cl.⁵ ............................................. H01S 3/08
[52] U.S. Cl. ................................... 372/107; 359/896; 372/98; 372/109
[58] Field of Search ................. 248/580; 372/92, 98, 372/87, 107, 109; 359/819, 821, 822, 823, 871, 872, 876, 896; 250/491.1

[56] References Cited
U.S. PATENT DOCUMENTS
4,278,324  7/1981  Zipfel .......................... 372/107 X
4,777,639  10/1988  Whitehouse ..................... 372/107

*Primary Examiner*—John D. Lee
*Attorney, Agent, or Firm*—Fliesler, Dubb, Meyer & Lovejoy

[57] ABSTRACT

A rotatable, bakeable vacuum sealed mount for an optical element, suitable for use on an endbell assembly for a gas discharge tube or as an integral part of a gas discharge tube for an ion laser comprises an elongated support member, having an axis and a passage along the axis of the support member. A first end of the support member is connected by a vacuum tight seal to the vacuum sealed chamber of the gas discharge tube, so that the passage has an opening toward the vacuum sealed chamber. A second end of the support member is connectable by vacuum tight seal to the optic, so that the second end of the passage has an opening toward the optic. A portion of the support member has a yield strength allowing adjustment by twisting of the support member about the axis for establishing a rotational alignment of the optic without breaking the vacuum of the vacuum sealed chamber. A bearing member, having a cylindrical bearing surface coaxial with the axis of the support member, supports the support member near the second end, so that the optic remains substantially transversely aligned relative to the axis of the support member during twisting for establishing the rotational alignment.

18 Claims, 3 Drawing Sheets

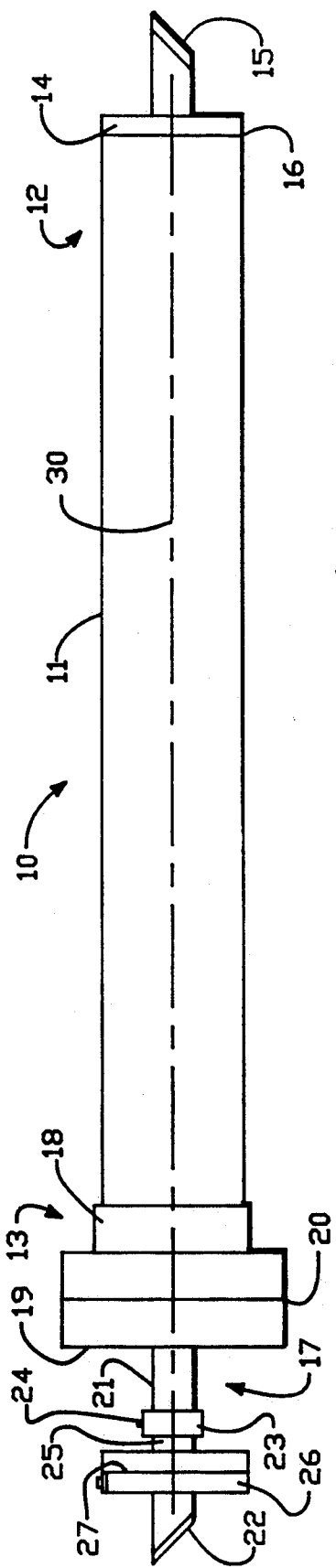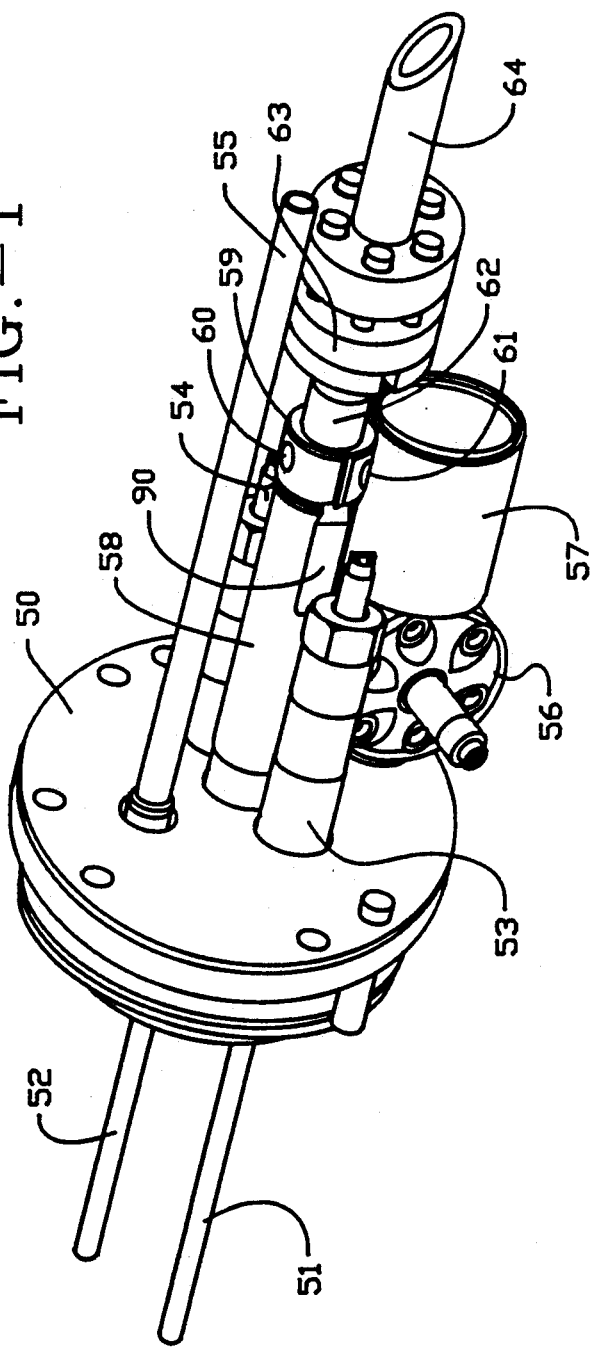
FIG.-1
FIG.-2

ROTATABLE VACUUM SEALED MOUNT FOR OPTICAL ELEMENT, ENDBELL ASSEMBLY FOR GAS DISCHARGE TUBE USING SAID MOUNT AND GAS DISCHARGE TUBE FOR ION LASER USING SAID MOUNT

BACKGROUND OF THE INVENTION

1. Field of the Invention

The present invention relates to mounts for optical elements on vacuum sealed chambers that can be rotationally adjusted; and particularly to such mounts for gas discharge tubes used in ion lasers.

2. Description of Related Art

Ion lasers, such as the Spectra-Physics Model 2040 argon ion laser, use gas discharge tubes to provide laser gain. The gas discharge tube confines a low pressure gas in a vacuum tight chamber which includes an anode and a cathode. Electric current between the anode and cathode induces a plasma which provides laser gain. Windows are provided at either end of the gas discharge tube, allowing light to escape without breaking the vacuum tight seal.

For minimum transmission losses through the windows in polarized laser systems, Brewster windows are typically mounted on the gas discharge tube. Because discharge tubes in many embodiments generate significant amounts of ultraviolet radiation, the Brewster windows are often made of UV resistant material, such as crystalline quartz. Crystalline quartz is less susceptible to damage from ultraviolet radiation than is fused quartz, or other materials that could be used for the Brewster windows. Also, it provides good transmission at the lower end of wavelengths generated by typical ion lasers.

In mounting Brewster windows, the surfaces of the windows must be transversely aligned so that the angle of incidence of light on the window is essentially Brewster's angle for the wavelength of interest, within a reasonable tolerance of, for example, ±2°. The Brewster windows must also be aligned rotationally, because each Brewster window will establish a plane of polarization. Thus, the Brewster window must be rotationally aligned so that plane of polarization for the window matches the desired polarization of the resonant cavity. This rotational alignment can be critical because significant loss occurs with very small misalignments. Crystalline quartz windows are particularly sensitive to misalignment because of birefringence. It is found, for instance, that a misalignment of approximately 0.5° causes greater than 5% loss for a typical system, depending on the wavelength and other factors.

This rotational alignment presents a difficult manufacturing problem for prior art gas discharge tubes. In the prior art tubes, the optics are placed on rigid mounts that are welded or otherwise rigidly mounted on the gas discharge tube. Optical alignment tooling is required during these manufacturing steps in order to insure adequate rotational alignment. Typically, this involves moving the parts from one place on the manufacturing floor to an alignment test site in order to accomplish the manufacturing step of attaching Brewster windows to the gas discharge tube. Therefore, it is desirable to provide a mount for an optical element on a gas discharge tube, which allows rotational alignment after assembling the gas discharge tube.

The requirements of gas discharge tubes, such as cleanliness and tolerance of bakeout at high temperatures, further complicate the design of the optic mount. Thus, prior art rotatable mounts which use low temperature materials like elastomers cannot be used in this environment. Vacuum bellows may provide the required cleanliness and high bakeout temperature tolerance, but are expensive and impractical for commercial laser systems.

Accordingly, it is desirable to provide a rotatable, bakeable vacuum sealed mount for optical elements, which can be used on an endbell assembly for a gas discharge tube in an ion laser and that is inexpensive and easily manufacturable.

SUMMARY OF THE INVENTION

The present invention provides a rotatable, bakeable vacuum sealed mount for an optical element, suitable for use on an endbell assembly for a gas discharge tube or as an integral part of a gas discharge tube for an ion laser. The mount comprises an elongated support member, having an axis, a first end, a second end, and a passage along the axis of the support member. The first end of the support member is connectable by a vacuum tight seal to a vacuum sealed chamber, such as a gas discharge tube, so that the passage has an opening toward the vacuum sealed chamber. The second end of the support member is connectable by vacuum tight seal to the optic, so that the second end of the passage has an opening toward the optic. At least a portion of the support member has a yield strength allowing adjustment by twisting of the support member about the axis for establishing a rotational alignment of the optic without breaking the vacuum of the vacuum sealed chamber. A bearing member, having a cylindrical bearing surface coaxial with the axis of the support member, supports the support member near the second end, so that the optic remains substantially transversely aligned relative to the axis of the support member during twisting for adjustment of the rotational alignment.

The support member, according to one aspect of the invention, comprises a tube segment, a first rigid adaptor segment connected to a first end of the tube segment, and a second rigid adaptor segment connected to the second end of the tube segment. The tube segment has a yield strength allowing twisting about the axis for the purpose of rotational alignment. The bearing member supports the support member at the second rigid adaptor segment.

The tube segment may consist of a first material, such as copper, having a first yield strength, and the first and second rigid adaptor segments may consist of other material, such as steel, and have yield strengths greater than the first yield strength. Alternatively, all three segments may be manufactured of a single material, in which a tube segment has a reduced wall thickness along at least a portion of the tube segment to establish a yield strength lower than the yield strengths of the first and second rigid adaptor segments.

According to another aspect, set screws or other systems for securing the rotational position of the second end of the support member may be provided to maintain rotational alignment after it has been adjusted.

The present invention also provides a gas discharge tube for an ion laser, which includes a polarization dependent optic mounted on a rotatable mount such as that described above.

In another alternative, the present invention provides an endbell assembly for a gas discharge tube comprising a rotatable mount such as that described above coupled with a header flange designed to be mounted on a gas discharge tube.

Accordingly, the present invention provides a low cost approach for allowing rotational adjustment of laser optics, which is fully compatible with high temperature vacuum sealing and allows multiple adjustments. Other aspects and advantages of the present invention can be seen upon review of the figures, the detailed description, and the claims which follow.

BRIEF DESCRIPTION OF THE FIGURES

FIG. 1 is a diagram of a gas discharge tube, including the rotatable optic mount according to the present invention.

FIG. 2 is a drawing of a header flange for a gas discharge tube including the rotatable mount according to the present invention.

DESCRIPTION OF THE PREFERRED EMBODIMENTS

Figure 3:
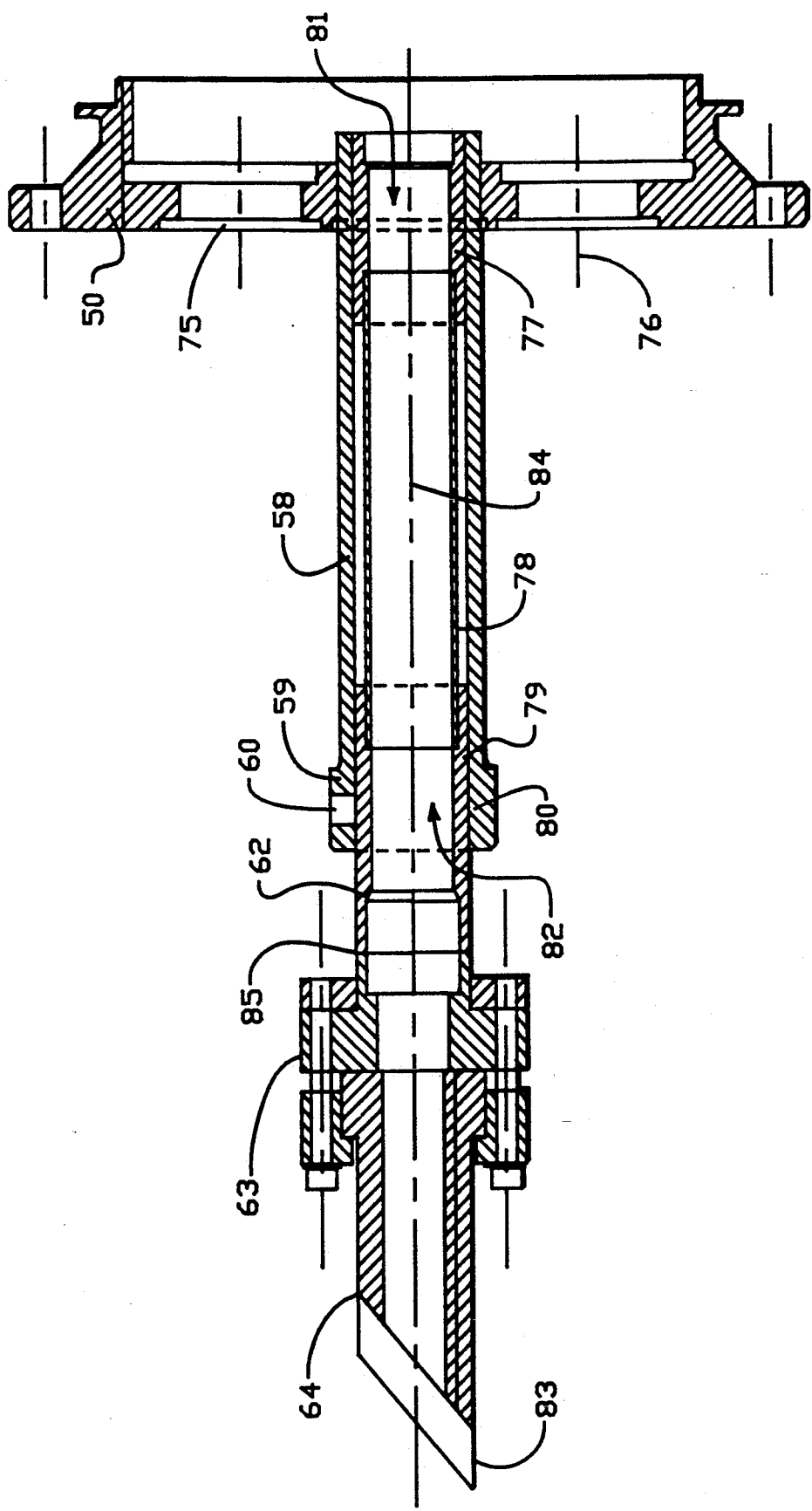
FIG. 3 is a cross-sectional view of the rotatable mount according to the present invention.

A detailed description of preferred embodiments of the present invention is provided with respect to the figures.

FIG. 1 is a simplified view of a gas discharge tube, generally referred to by reference numeral 10, such as is used in the Spectra-Physics Model 2040 ion laser, manufactured by Spectra-Physics Lasers, Inc., in Mountain View, Calif. Not shown in FIG. 1 are an electromagnetic coil used for establishing an axial magnetic field through the discharge tube, or electrical and other connections to the discharge tube used for establishing and maintaining a gas discharge within the tube. However, those skilled in the art will recognize that these components are provided in a variety of configurations in lasers using gas discharge tubes as a source of laser gain.

The gas discharge tube 10 includes an elongated discharge chamber 11 having a first end 12 and a second end 13 for confining in a vacuum tight chamber a gas discharge medium such as argon gas at low pressure. An anode assembly 14 is mounted on the first end 12 of the discharge chamber 11. The anode assembly 14 supports an anode (not shown) within the discharge chamber, and includes window 15 allowing light to escape the discharge chamber. The anode assembly 14 is mounted by a vacuum tight seal, schematically at 16, on the first end 12 of the discharge chamber 11.

On the second end 13 of the discharge chamber 11, a cathode assembly 17 is mounted. The cathode assembly 17 includes a face plate 18 mounted on the discharge chamber 11, and a removable header flange 19 which is mounted by a vacuum tight seal, schematically at 20, to the faceplate 18. A rotatable mount 21 coupled to the header flange 19 supports an optic 22, such as a Brewster window, on the header flange 19, allowing light to escape out the cathode end of the discharge chamber 11. The rotatable mount includes a support member 25, and a bearing 23 with a set screw 24 which supports the support member 25 to maintain transverse alignment of the optic 22. The support member 25 is secured by a flange 26 to the optic 22. The flange 26 provides a vacuum tight seal, schematically at 27, to the support member 25.

The anode assembly 14 and the cathode assembly 17 establish a discharge path along the length of the discharge tube. An optical path 30 between the window 15 and optic 22 passes through the discharge path for laser gain.

The window 15 and optic 22 in the preferred system are Brewster windows manufactured of crystalline quartz and mounted transversely with respect to the optical path 30 at essentially Brewster's angle for the wavelength of interest within manufacturing tolerances. Each Brewster window 15, 22 thus establishes a preferred polarization for propagation of light along the optical path 30. The rotational alignment of the Brewster windows about the axis defined by optical path 30 is therefore critical to match the polarization preferred by the Brewster window 22 with the polarization preferred by the Brewster window 15.

According to the present invention, the rotatable mount 21 can be used to adjust the rotational alignment of the optic 22 to a desired position, which matches the polarization set by Brewster window 15 or an otherwise preferred polarization in a given application. Thus, after assembling the discharge tube 10, a manufacturing step for a laser would involve gripping the flange 26 or support member 25, and the bearing member 23 and twisting the support member 25 about the axis to establish the preferred rotational alignment. This can be done while the laser is operating, so that optimum alignment can be achieved using feedback from the actual laser. A set screw 24, or other securing mechanism, can then be used to secure the rotational alignment.

The set screw 24 may not be required for certain materials, such as copper, which will hold a position after twisting without significant creep.

The discharge tube 10 of FIG. i provides one example of a system which could use the rotational mount according to the present invention. The rotational mount is usable within any vacuum sealed chamber in which an optic must be adjusted rotationally without breaking the vacuum of the sealed chamber. Also, the discharge tube 10 of FIG. 1 could be modified to a variety of configurations. A rotatable mount could be provided on each end of the discharge tube. Polarization dependent optics other than Brewster windows may be utilized. The discharge tube 10 may have a polarization dependent optic on only one end. For instance, the window 15 may be composed of a polarization independent optic, such as a window with anti-reflective coating, an output coupler, or a highly reflecting mirror. Those skilled in the art will recognize that the discharge tube 10 shown in FIG. 1 is representative of a wide variety of configurations which may utilize the rotatable mount according to the present invention.

FIG. 2 is a perspective of a cathode assembly for a gas discharge tube in an ion laser according to the present invention. The cathode assembly includes a header flange 50 designed for mounting by vacuum tight seal on a gas discharge tube.

The header flange 50 supports cathode electrodes 51, 52, on which a cathode (not shown) is mounted within the discharge tube. Electrode feedthroughs 53 and 54 are mounted on the header flange 50 providing a vacuum tight feedthrough for the electrodes 51, 52.

A pinchoff tube 55 is mounted on the header flange 50. The pinchoff tube 55 is used for evacuating the discharge chamber and filling the discharge chamber with the gas such as argon used to establish the gas discharge medium within the chamber. Once the chamber is filled, the pinchoff tube 55 is closed and majority of its length is removed.

Also mounted on the header flange are a gas refill valve 56 and a gas refill reservoir 57. Over the life of the laser, as the gaseous discharge medium is consumed, the pressure within the discharge chamber can be adjusted using the refill valve 56 and reservoir 57 as known in the art.

Finally, the header flange 50 supports the rotatable mount according to the present invention. The rotatable mount includes a bearing member 58 with a bearing head 59. Set screws 60 and 61, and a third set screw (not shown) are provided in the bearing head 59. A support member 62 which is supported by the bearing member 58, is coupled to flange 63. The flange 63 provides a vacuum tight mount for structure 64 on which a laser optic (not shown) will be mounted. The flange 63 may be implemented using a wide variety of vacuum tight seal technologies, such as an indium gasket, a knife edge seal, 0-rings, and the like.

FIG. 3 is a cross-section of the rotatable mount on the header flange 50 shown in FIG. 2. In FIG. 3, the pinchoff tube, electrode feedthroughs, and gas refill valve and reservoir have been deleted for clarity. The header flange 50 as shown in cross-section in FIG. 3 includes openings 75 and 76 for receiving the electrode feedthroughs 53, 54 shown in FIG. 2. The reference numbers used in FIG. 2 are applied to the corresponding elements in FIG. 3 where appropriate.

Thus, it can be seen that the rotatable mount shown in FIG. 3 includes the bearing member 58 having a bearing head 59 with set screw 60. The support member 62 includes a first rigid adaptor segment 77, a twistable tube segment 78, and a second rigid adaptor segment 79. The first rigid adaptor segment 77 is mounted on the first end of the tube 78 by brazing or welding using any one of a variety of techniques. Similarly, the second rigid adaptor segment 79 is mounted on the second end of the tube 78.

The bearing member 58 includes a cylindrical bearing surface 80 adjacent to the bearing head 59. Similarly, the second rigid adaptor segment 79 includes a cylindrical surface which mates with the bearing surface 80 of the bearing member 58.

The first rigid adaptor segment 77 is welded or otherwise mounted by vacuum tight seal on the header flange 50. In the embodiment shown in FIG. 3, the bearing member 58 is welded to the header flange 50.

The first rigid adaptor segment 77 is welded to the bearing member 58. Thus, the tube 78 has an opening 81 near the first end toward the gas discharge chamber, when the header flange 50 is mounted. Similarly, the second end of the tube 78 has an opening 82 toward optic 83.

The tube segment 78 has an axis along the optical path 84 of the discharge tube. The cylindrical bearing surface 80 of the bearing member 58 is coaxial with the axis of the tube segment 78.

The flange 63 is orbitally welded to the second rigid adaptor segment 79 or otherwise connected to establish a vacuum tight seal 85.

The support member 62 thus consists of a tube segment 78 having a first end, a second end, and an axis, with a passage along the axis. The first rigid adaptor segment 77 is mounted on the first end of the tube 78. A second rigid adaptor segment 79 is mounted on the second end of the tube 78. The tube has a yield strength lower than the first and second rigid adaptor segments, which allows twisting of the support member to establish rotational alignment of the optic 83.

The bearing member 58 maintains the transverse alignment of the laser optic 83 during twisting of the support member 62. The bearing member 58 must mate with the second rigid adaptor segment 79 within relatively close tolerance, such that the transverse alignment of the optic 83 is not significantly affected during rotational alignment. It is found that a tolerance of <1° is sufficient for most practical laser systems. The longer the bearing surface 80, and the closer the fit of the bearing surface 80 to the adaptor segment 79, the better the transverse alignment of the optic 83 will be maintained during adjustment. As discussed above, it is found that the slightly increased losses due to tolerances in transverse alignment are more than overcome by the reduction of losses achieved by rotational adjustment, as provided by the present invention.

The bearing member 58 in one preferred system is manufactured using a steel cylinder having a 0.480 outside diameter and a 0.377±0.001 inch inside diameter. In the bearing surface 80 of the bearing member 58, the inside diameter is specified at 0.377 inches with tolerances of +0.001−0.000 inches. The bearing surface is 0.87±0.04 inches long. The length of the bearing member 58 from the outside surface of the flange 50 to the end of the bearing surface is 2.760 inches. Not shown in the figures, is a single vent hole of approximately 0.062 inches in diameter along the length of the bearing member 58 about halfway along the length to allow for the detection of any leaks in the completed seals between the support member 62 and the bearing member 58 that may occur in the manufacturing process.

As shown in FIG. 2, there are flat machined out areas 90 on either side of the bearing member 58. These machined out areas are provided to allow the structure to fit within an existing cathode assembly design, while making room for the electrode feedthroughs 53, 54, as shown in FIG. 2. These machined out areas 90 may be left off in a preferred design. However, this point illustrates the tight space requirements for optical mounts on gas discharge tubes.

Figure 4:
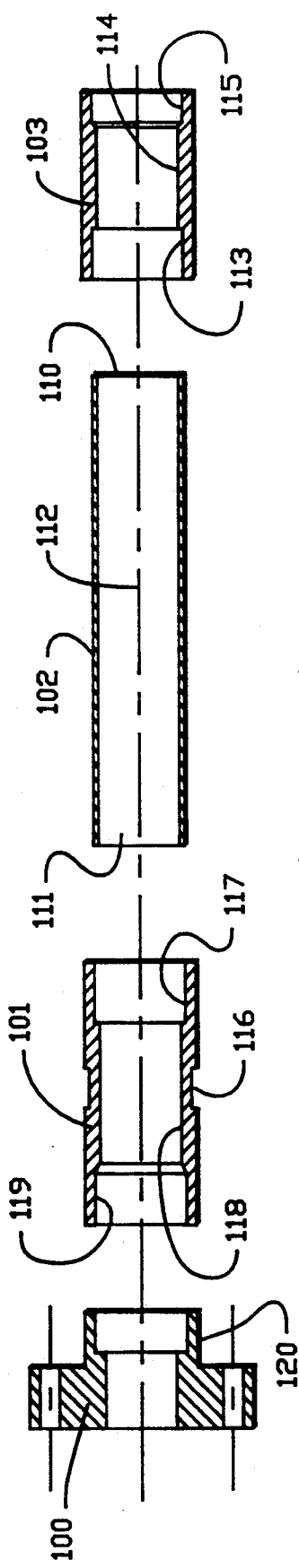
FIG. 4 is an exploded view of the rotatable support member of the rotatable mount according to the embodiment of FIG. 3.
Figure 5:
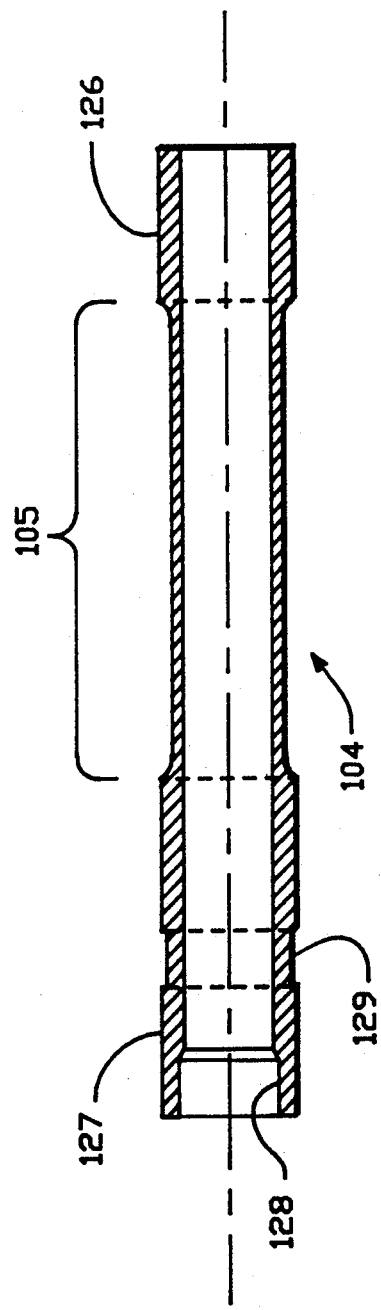
FIG. 5 is a drawing of the support member according to an alternative embodiment of the present invention.

Details concerning alternative embodiments of the support member of the rotatable mount are provided with respect to FIGS. 4 and 5. FIG. 4 illustrates a support member consisting of a steel flange head 100, a steel second rigid adaptor segment 101, a copper tube segment 102, and a steel first rigid adaptor segment 103. FIG. 5 illustrates a support member made of a unitary steel member 104 having a reduced wall thickness along a portion 105 of the tube segment.

As mentioned above, FIG. 4 provides an exploded view of the support member 62, shown assembled in FIG. 3. The support member consists of a tube segment 102 having a first end 110 and a second end 111. The tube segment 102 is a cylindrical member having an axis 112. It is manufactured in a preferred system of copper tubing 1.750 inches long having an inside diameter of 0.250 inches with a tolerance of +0.005 and −0.003 inches and an outside diameter of 0.3125 inches with a tolerance of ±0.002 inches. The first end 110 and second end 111 may be machined at an angle 90° to the axis 112 in a preferred embodiment. The first rigid adaptor segment 103 consists of a steel member with an outside diameter of 0.3720 inches. The inside of the first rigid adaptor segment includes a first portion 113 adapted to receive the first end 110 of the tube segment 102 for attachment by brazing. The inside diameter of the first portion 113 is approximately 0.3150 inches with a tolerance of +0.0012 inches and −0.0000 inches. The length of the first portion 113 is approximately 0.27 inches. A second portion 114 of the first rigid adaptor segment 110 has an inside diameter of approximately 0.261 inches ±0.003 inches. The length of the second portion 114 is approximately 0.54 inches. A third portion 115 of the first rigid adaptor segment 103 has an inside diameter of approximately 0.277 inches ±0.004 inches with a length of approximately 0.1 inches. The third portion thins the wall thickness down to improve the ease of welding to the bearing members.

The second rigid adaptor segment 101 again consists of a steel member 101 having an outside diameter along the majority of its length of 0.3750 inches ±0.0005 inches. The overall length of the second rigid adaptor segment 101 is approximately 1.050 inches. A groove 116 approximately at the center of the segment about 0.170 inches wide having an outside diameter of 0.370±0.003 inches is machined in the segment. This groove 116 is adapted to receive the set screws from the bearing head 59 as shown in FIG. 3.

The inside diameter of the second rigid adaptor segment 101 includes a first portion 117 adapted to receive the second end 111 of the tube segment 102 for attachment by brazing. The first portion has a length of approximately 0.27 inches and an inside diameter of 0.3150 with a tolerance of +0.0012 and −0.0000 inches. The inside of the second rigid adaptor segment 10 includes a second portion 118 which is approximately 0.60 inches long and having an inside diameter of approximately 0.261±0.003 inches. Finally, a third portion 119 of the inside of the second rigid adaptor segment 101 has an inside diameter of approximately 0.305±0.003 inches. A facing plate 100 for the flange 63 is included and manufactured out of steel. It has a first extending portion 120 designed to mate wtih the third portion 119 of the second rigid adaptor segment 101. The extended portion 120 is welded by means of an orbital weld to the second rigid adaptor segment 101, or otherwise rigidly fixed.

In the embodiment of FIG. 4, the tube segment is manufactured of a first material and has a first yield strength, and the first and second rigid adaptor segments 101, 103 are manufactured using other material and have higher yield strengths. This insures that during twisting of the support member, the tube segment Will yield first, and the adaptor segments which provide the vacuum tight seal or the bearing surface remain undeformed. In the example described, the tube segment is manufactured using copper and the adaptor segments are manufactured using 304/304L stainless steel. Those skilled in the art will recognize that a wide variety of other materials could be utilized.

In FIG. 5, an alternative embodiment of the support member 104 is described. In this embodiment, the tube segment 105, the first rigid adaptor segment 126, and the second rigid adaptor segment 127 consist of a single piece of steel. The first rigid adaptor segment 126 has an outside diameter of approximately 0.3724 inches ±0.0006 inches, and an inside diameter of approximately 0.261 inches. The tube segment 105 has a reduced wall thickness to establish an outside diameter of approximately 0.322±0.0015 inches. The second rigid adaptor segment 127 has an outside diameter of 0.3750 inches ±0.0005 inches. The inside diameter is consistent along the entire length of the support member 105 at approximately 0.261 inches, with the exception of the end portion 128 of the second rigid adaptor segment 127, which is out to match the flange 63 of FIG. 3. A groove 129 is machined into the second rigid adaptor segment 127 as discussed above with respect to FIG. 4. In the embodiment of FIG. 5, the support members consist of a single material, and the reduced wall thickness along the tube segment 105 establishes an effective yield strength that insures the tube segment will deform during twisting, while the first rigid adaptor segment and second rigid adaptor segment will remain undeformed to maintain the vacuum tight seal on the first rigid adaptor segment and the integrity of the bearing surface on the second rigid adaptor segment.

It is found that the embodiment of FIG. 4, in which the tube segment 102 consists of annealed copper, allows repeated rotational adjustments in a range of ±20° without leaking or hardening at relatively low torques. In practical applications, rotational adjustment of a few degrees may be sufficient. The copper tube may be replaced with any metal, the only constraints being ease of rotation which is dependent upon the length, diameter and wall thickness of the tube, and the particular material chosen. Material compatibility with vacuum devices, joining techniques, temperatures of bakeout or operation of the system, and economy also constrain the selection of materials used in the rotatable mount of the present invention. The embodiment of FIG. 5 consisting of a single steel member was also satisfactory, but requires greater tube length to allow rotational adjustment with reasonable torques. The designs of the support member and the bearing member could be modified in a wide variety of configurations to provide the particular rotational alignment characteristics desired.

The present invention provides a rotatable mount for a laser optic on a vacuum sealed chamber which is both inexpensive, bakeable, and maintains the integrity of the vacuum chamber. Furthermore, with the rotatable mount according to the present invention, the manufacturing of a gas discharge tube for an ion laser can be simplified. It eliminates the need for an optical alignment tooling during manufacture, and allows the optic alignment to be tuned in an operating laser configuration. This greatly simplifies the rotational alignment step, and provides greater flexibility for optimizing the alignment to a particular wavelength.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An adjustable mount for an optic on a vacuum sealed chamber, comprising:
   a support member, having an axis, a first end, a second end and a passage along the axis, the first end connectable by a vacuum tight seal to the vacuum sealed chamber so that the passage has an opening toward the vacuum sealed chamber, the second end connectable by a vacuum tight seal to the optic so that the second end of the passage has an opening toward the optic, wherein at least a portion of the support member has a yield strength allowing adjustment by twisting of the support member about the axis for establishing a rotational alignment of the optic without breaking the vacuum of the vacuum sealed chamber; and a bearing member, having a cylindrical bearing surface coaxial with the axis of the support member, supporting the support member near the second end so that the optic remains substantially transversely aligned relative to the axis during adjustment for establishing the rotational alignment.

2. The adjustable mount of claim 1, wherein the support member includes:

a tube segment having a first end and a second end, and having a yield strength allowing twisting about the axis of the support member;

a first rigid adaptor segment, connected to the first end of the tube segment; and a second rigid adaptor segment, connected to the second end of the tube segment.

3. The adjustable mount of claim 2, wherein the second rigid adaptor segment includes a cylindrical outside surface, and the bearing surface of the bearing member supports the support member at the cylindrical outside surface of second rigid adaptor segment.

4. The adjustable mount of claim 2, wherein the tube segment consists of a first material and has a first yield strength, and the first rigid adaptor segment and the second rigid adaptor segment consist of other material and have yield strengths greater than the first yield strength.

5. The adjustable mount of claim 2, wherein the first rigid adaptor segment, tube segment, and second rigid adaptor segment consist of a single material, and the tube segment has a reduced wall thickness along at least a portion of the tube segment to establish a yield strength allowing twisting about the axis.

6. The adjustable mount of claim 1, further including:

means, coupled with the bearing member, for securing a rotational position of the second end of the support member to maintain the rotational alignment.

7. A gas discharge tube for an ion laser, comprising:

an elongate discharge chamber having a first end and a second end for confining a gas discharge medium;

an anode assembly, mounted by a vacuum tight seal on the first end of the discharge chamber;

a cathode assembly, mounted by vacuum tight seal on the second end of the discharge chamber;

a polarization dependant optic; 'a support member, having an axis, a first end, a second end a passage along the axis, including a first vacuum tight seal connecting the first end of the support member to the cathode assembly so that the passage has an opening to the discharge chamber, and a second vacuum tight seal connecting the second end of the support member to the optic, so that the second end of the passage has an opening toward the optic, wherein at least a portion of the support member has a yield strength allowing adjustment by twisting of the support member about the axis for establishing a rotational alignment of the optic without breaking the first or second vacuum tight seals; and a bearing member, having a cylindrical bearing surface coaxial with the axis of the support member, supporting the support member near the second end so that the optic remains substantially transversely aligned relative to the axis during adjustment for establishing the rotational alignment.

8. The gas discharge tube of claim 7, wherein the support member further includes:

a tube segment having a first end and a second end, and having a yield strength allowing twisting about the axis of the support member;

a first rigid adaptor segment, connected to the first end of the tube segment and the first vacuum tight seal; and a second rigid adaptor segment, connected to the second end of the tube segment and the second vacuum tight seal.

9. The gas discharge tube of claim 8, wherein the second rigid adaptor segment includes a cylindrical outside surface, and the bearing surface of the bearing member supports the support member at the cylindrical outside surface of the second rigid adaptor segment.

10. The gas discharge of claim 8, wherein the tube segment consists of a first material and has a first yield strength, and the first rigid adaptor segment and the second rigid adaptor segment consist of other material and have yield strengths greater than the first yield strength.

11. The gas discharge tube of claim 8, wherein the first rigid adaptor segment, tube segment, and second rigid adaptor segment consist of a single material, and the tube segment has a reduced wall thickness along at least a portion of the tube segment to establish a yield strength allowing twisting about the axis.

12. The gas discharge tube of claim 7, further including:

means, coupled with the bearing member, for securing a rotational position of the second end of the support member to maintain the rotational alignment.

13. The gas discharge tube of claim 7, wherein the anode assembly comprises a first Brewster window rigidly mounted on the anode assembly establishing a polarization for light transmitted out of the discharge chamber.

14. The gas discharge tube of claim 13, wherein the polarization dependent optic comprises a second Brewster window, so that the rotational alignment aligns the second Brewster window with the polarization established by the first Brewster window.

15. An endbell assembly for a gas discharge tube in an ion laser, comprising:

a header flange;

a polarization dependent optic;

a support member, mounted on the header flange, including a tube segment having an axis, a first end and a second end, a first rigid adaptor segment, connected to the first end of the tube segment, and a second rigid adaptor segment, connected to the second end of the tube segment, the tube segment having a yield strength lower than yield strengths of the first and second rigid adaptor segments allowing adjustment by twisting of the tube segment around the axis for establishing a rotational alignment of the second rigid adaptor segment;

a first vacuum tight seal connecting the first rigid adaptor segment to the header flange;

a second vacuum tight seal connecting the second rigid adaptor segment to the optic so that the rotational alignment of the second rigid adaptor segment defines a rotational alignment of the optic; and a bearing member, mounted on the header flange and having a cylindrical bearing surface coaxial with the axis of the tube segment, supporting the second rigid adaptor segment so that the optic remains substantially transversely aligned relative to the axis during adjustment for establishing the rotational alignment.

16. The endbell assembly of claim 15, wherein the tube segment consist of a first material and has a first yield strength, and the first rigid adaptor segment and the second rigid adaptor segment consist of other material and have yield strengths greater than the first yield strength.

17. The endbell assembly of claim 15, wherein the first rigid adaptor segment, tube segment, and second rigid adaptor segment consist of a single material, and the tube segment has a reduced wall thickness along at least a portion of the tube segment to establish a yield strength allowing twisting about the axis.

18. The endbell assembly of claim 15, further including:

means, coupled with the bearing member, for securing a rotational position of the second rigid adaptor segment to maintain the rotational alignment.

* * * * *